Figure 1:
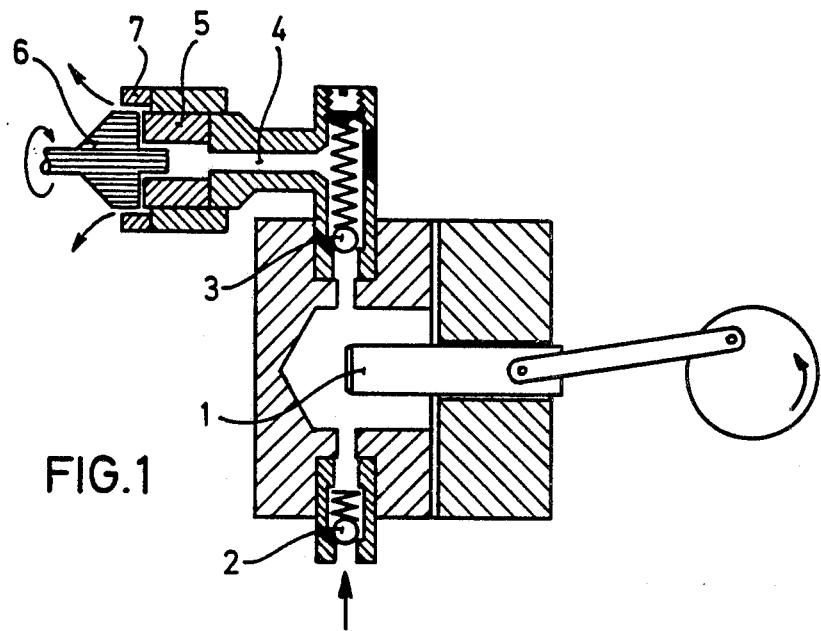

United States Patent [19]

Motz et al.

[11] 4,267,203

[45] May 12, 1981

[54] MANUFACTURE OF MAGNETIC RECORDING MEDIA

[75] Inventors: Herbert Motz, Willstaett; Dieter Schaefer, Lindenberg; Werner Huebner, Frankenthal; Dieter Mayer, Ludwigshafen, all of Fed. Rep. of Germany

[73] Assignee: BASF Aktiengesellschaft, Fed. Rep. of Germany

[21] Appl. No.: 86,135

[22] Filed: Oct. 18, 1979

[30] Foreign Application Priority Data

Oct. 26, 1978 [DE] Fed. Rep. of Germany ....... 2846623

[51] Int. Cl.³ .............................................. B05D 3/14
[52] U.S. Cl. .................................. 427/48; 252/62.54; 427/128
[58] Field of Search ............................... 427/128–132, 427/48; 252/62.54

[56] References Cited

U.S. PATENT DOCUMENTS 3,836,395  9/1974  Roller .................................. 117/238

FOREIGN PATENT DOCUMENTS 1186906  2/1965  Fed. Rep. of Germany .
2119569  12/1972  Fed. Rep. of Germany .
758843  10/1956  United Kingdom .

*Primary Examiner*—Bernard D. Pianalto
*Attorney, Agent, or Firm*—Keil & Witherspoon

[57] ABSTRACT

A process for the manufacture of magnetic recording media by dispersing a mixture of particulate anisotropic magnetic material and additives in a solution of a polymeric binder in an organic solvent, compressing and then releasing the pressure on the dispersion, thereafter applying a layer of the dispersion to a non-magnetizable base, orienting the anisotropic magnetic material by means of a magnetic field, and drying the coating.

3 Claims, 2 Drawing Figures

MANUFACTURE OF MAGNETIC RECORDING MEDIA

The present invention relates to a process for the manufacture of a magnetic recording medium which consists of a non-magnetic base and, applied thereto, one or more firmly adhering layers of an anisotropic magnetic material finely dispersed in an organic polymeric binder.

In the conventional processes for the manufacture of magnetic recording media, the acicular magnetic materials, together with additives, eg. dispersants, antistatic agents, lubricants and non-magnetic adjuvants, are dispersed in a solution of an organic polymeric binder in an organic solvent. The finer and more uniform the dispersion of the magnetic particles in the mixture is, the more advantageous is the effect on the electroacoustic and mechanical properties of the magnetic coating. It is known that magnetic particles are difficult to disperse in a fluid phase, due to their magnetic attraction and due to their acicular shape, and that they tend to agglomerate after only a short period of storage.

Furthermore, the high specific gravity of the magnetic material employed, as compared to conventional fillers, promotes phase separation. All these phenomena manifest themselves in magnetic coatings, prepared from such dispersions, in a deterioration in the magnetic and electroacoustic properties and in an increase in surface roughness, which in turn can adversely affect the mechanical properties, such as abrasion.

There have therefore been many attempts to improve the dispersion of the acicular magnetic material by suitable chemical and physical additives. For this reason, it has been frequently proposed to add dispersing agents to the fluid magnetic coating mixtures at the very beginning of the dispersing operation, in order to facilitate dispersion of the magnetic material in the binder phase. In particular, surface-active agents which possess a hydrophilic and a hydrophobic radical in the molecular structure and in which the active structure is of anionic, cationic, amphoteric or nonionic character, are employed for this purpose. The amount of each dispersant has to be matched very carefully to the total weight of the formulation, since under adverse external conditions an excess of such a substance can very easily migrate to the surface of the magnetic recording medium and cause deposits on the parts of the recorder over which the tape travels, which is extremely undesirable. With most dispersants it is furthermore found that only a certain amount is adsorbed by the magnetic particles, so that the use of an excess of dispersant does not bring about an improvement in dispersibility, with the result that the packing density and orientability of the magnetic materials cannot be improved.

German Published Application DAS No. 1,186,906 discloses the preparation of a stiff paste by thoroughly mixing an iron oxide powder with a fluid vehicle, the paste then being converted, by homogeneous kneading, into an agglomerate-free mixture. A dispersion is then prepared by mixing this paste with binders, and this dispersion gives magnetic coatings exhibiting a high packing density. However, the orientability of the acicular magnetic materials is not improved to the same degree.

Furthermore, the above measure does not overcome the problem of re-agglomeration of the magnetic particles in this dispersion on storage or transportation. For this reason, German Pat. No. 2,119,569 proposes that the finished dispersion containing magnetic material should, preferably immediately before application to the base, be subjected to shearing forces by passing it through an annular gap formed between the inner wall of a cylindrical vessel and the periphery of a disk or cylinder rotating therein. The disk employed has saw-like teeth around its periphery. However, the improvement that can be achieved is slight. On increasing the speed of rotation of the disk or of the cylinder, undesirable inhomogeneities form in the magnetic dispersion.

The measures described above for improving the degree of dispersion of the acicular magnetic material in the binder system are, however, insufficient to ensure both the homogeneity and, in particular, the stability of the dispersion. On the other hand, especially in the industrial manufacture of magnetic recording media, the dispersions employed must have a sufficiently long shelf life without there being any impairment of the electroacoustic and mechanical properties of the recording media produced with the dispersion.

It is an object of the present invention to provide a process for the manufacture of a magnetic recording medium, in which the above disadvantages are avoided, and in particular to provide dispersions, employed in the manufacture of magnetic recording media, of the acicular magnetic materials in a solution of an organic polymeric binder, which are distinguished by particularly homogeneous distribution of the magnetizable particles in the fluid phase and above all by a lesser tendency to re-agglomerate.

We have found that, surprisingly, these objects are achieved, and the above disadvantages avoided, in a process for the manufacture of magnetic recording media by dispersing a mixture of particulate anisotropic magnetic material and additives in a solution of a polymeric binder in an organic solvent, applying a layer of the dispersion to a non-magnetizable base, orienting the anisotropic magnetic material by means of a magnetic field, and drying the coating, if, before application to the base, the dispersion is subjected to a pressure of from 89 to 784 bar and is immediately thereafter released under pressure through a valve onto an impact member. Preferably, the valve is in the form of a nozzle or annular gap.

The process according to the invention is suitable for all types of dispersions provided they consist of anisotropic magnetic material dispersed in a binder together with a solvent. The dispersions are of conventional composition and are prepared by conventional methods.

Preferred magnetically anisotropic materials are particulate acicular gamma-iron(III)oxide having an average particle length of from 0.1 to 2 $\mu$m and especially of from 0.1 to 0.9 $\mu$m, or acicular chromium dioxide of the same particle length. Further suitable materials are gamma-iron(III) oxide modified with heavy metals, especially cobalt, and particulate metal alloys of iron, cobalt and/or nickel.

Binders which may be used for the preparation of the magnetic dispersion are those conventionally used for the production of magnetic coatings, such as alcohol-soluble copolyamides, polyvinylformals, polyurethane elastomers, mixtures of polyisocyanates and polyhydroxy compounds of relatively high molecular weight, and vinyl chloride polymers containing more than 60% of vinyl chloride units, for example vinyl chloride copolymers with comonomers such as vinyl esters of monocarboxylic acids of 2 to 9 carbon atoms, esters of aliphatic alcohols of 1 to 9 carbon atoms and ethylenically unsaturated carboxylic acids of 3 to 5 carbon atoms, eg. esters of acrylic acid, methacrylic acid or maleic acid, or the said ethylenically unsaturated carboxylic acids themselves, as well as hydroxyl-containing vinyl chloride copolymers which are obtainable by partial hydrolysis of vinyl chloride/vinyl ester copolymers or by direct copolymerization of vinyl chloride with hydroxyl-containing monomers, eg. allyl alcohol, 4-hydroxybutyl acrylate or methacrylate or 2-hydroxyethyl acrylate or methacrylate. Further suitable binders are mixtures of polyurethane elastomers with polyvinylformals, phenoxy resins and PVC copolymers of the stated composition. Preferred binders are polyvinylformal binders and polyurethane elastomer mixtures of the above type, above all mixtures with polyvinylformals. The preferred polyurethane elastomer binders are commercial elastomeric polyester-urethanes obtained from adipic acid, 1,4-butanediol and 4,4'-diisocyanatodiphenylmethane.

Suitable organic solvents for the preparation of the magnetic dispersion are the organic solvents conventionally used for this purpose, in particular aromatic hydrocarbons, eg. benzene, toluene or xylene, alcohols, eg. propanol or butanol, ketones, eg. acetone or methyl ethyl ketone, ethers, eg. tetrahydrofuran or dioxane, and mixtures of such solvents with other solvents and solvent mixtures conventionally used for surface-coating binders.

The dispersions may contain further additives used in the production of magnetic coatings, for example lecithins, small amounts of monocarboxylic acids or mixtures of these (the preferred additives in the case of chromium dioxide being zinc oleate, zinc stearate and zinc isostearate), fillers, eg. conductive carbon, graphite, quartz powder and/or non-magnetizable silicate-based powders, and flow improvers, eg. small amounts of silicone oil. The total amount of these additives should advantageously not exceed 12% by weight, preferably 8% by weight, based on the dry weight of the magnetic coating.

To prepare the dispersion, the magnetic material is dispersed in the binder used and a sufficient amount of solvent, together with the further additives, in a dispersing apparatus, for example a tube mill or a stirred ball mill. To obtain the appropriate binder-pigment ratio, further amounts of binder, either in the form of granules or as a solution of from 10 to 60% strength, may be added to this mixture.

The dispersion thus obtained is then compressed in conventional special equipment, for example a high-pressure piston pump, to a pressure of from 98 to 784 bar, in particular of from 294 to 588 bar, and is then forced through a valve in the form of a nozzle or annular gap, and immediately impinges on an impact member, with spontaneous release of pressure. Not only are shearing forces thereby exerted on the mixture, but the acceleration in the annular gap or nozzle and the resulting great decrease in pressure acting on the dispersion causes cavitation. The result of the high shearing forces, the cavitation and the turbulence to which the dispersion is subjected is that the magnetic material is in an extremely uniform and fine state of dispersion in the mixture leaving the apparatus described. Agglomerates are completely broken up and the dispersion has a much lesser tendency to settle and reagglomerate on storage.

The compression and decompression of the dispersion, carried out in the course of the process according to the invention, advantageously follows the preparation of the dispersion. A dispersion thus treated is usable even after several weeks' storage, without any impairment of the electroacoustic and mechanical properties of the magnetic recording media produced therewith. However, the process according to the invention can be used with advantage for treating a stored dispersion immediately before it is applied to the base.

BRIEF AND DETAILED DESCRIPTION OF THE DRAWING

The process according to the invention is described, by way of example, in more detail below with reference to the accompanying drawings.

FIG. 1 shows a homogenizing apparatus which consists essentially of a high-pressure pump, preferably a piston pump, and a homogenizing head. In operation, the dispersion is drawn in through the intake valve 2 by the rearward motion of the piston 1. The intake valve closes whilst the piston is executing its forward motion. After reaching a pressure peak, the pressure valve 3 opens and the dispersion to be homogenized passes via a bore 4 into the homogenizing head, where it is released under pressure through the annular gap between a cylindrical member 5 and an insert 6. The product impinges on an impact ring 7 located behind the gap and then flows out. In a particular embodiment of this apparatus, the insert 6 may be rotated.

Figure 2:
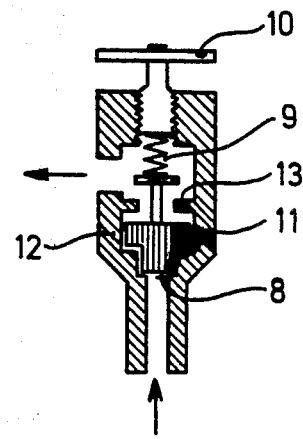

FIG. 2 shows a different embodiment of the homogenizing head. Here, the pressure valve and the homogenizing head are integral with one another. The valve 8, the opening pressure of which can be adjusted by means of a handle 10 via a compressible spring 9, opens when a pressure peak is reached. The dispersion flows through the annular gap which is formed by the valve insert 11 and the wall 12. The dispersion expands, strikes an impact ring 13, changes direction and flows out.

The dispersions treated in the above-described way can then be stored for lengthy periods without loss of quality. Thereafter, the dispersion can be applied to the non-magnetizable base by means of conventional coating equipment, for example a knife coater. Suitable non-magnetic and non-magnetizable base materials are those conventionally used, especially films of linear polyesters, eg. polyethylene terephthalate, which in general have a thickness of from 4 to 100 μm, especially from 6 to 36 μm. Before the coating mixture, which is still fluid, is dried on the base—which is advantageously carried out by heating at from 50° to 90° C. from 2 to 5 minutes—the anisotropic magnetic particles are oriented in the intended recording direction, and parallel to the surface of the base, by exposure to a magnetic field. Thereafter, the magnetic coatings can be calendered on conventional equipment by passing the coated base material between polished rollers optionally heated to temperatures of from 50° to 100° C., preferably from 60° to 80° C. The thickness of the magnetic coating is in general from 1 to 20 μm, preferably from 2 to 10 μm.

Compared to those obtained by prior art methods, the magnetic recording media obtained according to the invention are distinguished by an improvement in the magnetic, mechanical and electroacoustic properties. This is substantially true even if the dispersion of the magnetic material is stored for several weeks before being further processed.

The Examples and Comparative Experiments which follow illustrate the advantages of the process according to the invention.

EXAMPLE 1

A magnetic dispersion produced in a ball mill in the conventional manner and consisting of 28.7 parts of an acicular gamma-$Fe_2O_3$ (coercive force 24.1 kiloamps/m), 63.2 parts of a mixture of equal parts of tetrahydrofuran and dioxane, 2.2 parts of a copolymer of 91 parts of vinyl chloride, 3 parts of vinyl acetate and 6 parts of vinyl alcohol, 5 parts of thermoplastic, soluble polyurethane elastomer prepared from a linear polyester, 1,4-butanediol and diphenylmethane diisocyanate, 0.7 part of lecithin and 0.3 part of a polymeric dimethylsilicone oil is brought to a pressure of 400 bar in a homogenizing apparatus as shown in FIG. 1, and is then released under pressure through the annular gap. A 5 μm thick layer of the dispersion is then applied to 12 μm thick polyethylene terephthalate film and is dried after passing through a magnetic field, which orients the particles with their longitudinal axes in the direction of tape travel. The coated film is then calendered by psssing it between heated steel rollers, and is cut into tapes 3.81 mm wide.

The following properties of these tapes are determined:

(1) Magnetic properties, in particular the residual induction $M_R$ in [mT] measured after the application of a magnetic field of 100 kiloamps/m. The residual induction $M_R$ in the direction of orientation of the particles, and the orientation ratio RF, ie. the ratio of residual induction in the direction of orientation to that in the crosswise direction, are given.

(2) Electroacoustic properties, in particular the maximum output levels at long and short wavelengths, $A_T$ and $A_H$, measured according to DIN No. 45,512.

(3) The average peak-to-valley height $R_{tm}$ (the mean distance between the 5 highest peaks and 5 deepest valleys) in μm.

(4) Mechanical properties

A signal having a frequency of 10 kHz is recorded on a cassette tape over a length of about 200 cm. This length of tape is then rewound in contact with the magnetic head and the recorded signal is reproduced, the playback voltage being recorded on a graphic recorder. After this, the length of tape is rewound again, the old recording is erased and a new signal of 10 kHz is again recorded and reproduced. This procedure is repeated a total of 50 times. Since a new recording is made each time, this test is also very suitable for detecting slight deposits on the head and coating wear. The test is carried out at room temperature. The drop in signal level and the amount of abraded material deposited on the pole faces of the recording/playback head can be taken as a measure of the wear resistance of the tape. The degree of abrasion is assessed visually by stripping the abraded material from the pole faces of the head with an adhesive tape and sticking the latter onto white paper, and is classified according to a 6-rating scale, 1 denoting no abrasion and 6 very marked abrasion.

The measurements are shown in the Table.

EXAMPLE 2

The procedure described in Example 1 is followed, but instead of the homogenizing apparatus shown in FIG. 1, an apparatus as shown in FIG. 2 is employed. The measurements are shown in the Table.

EXAMPLE 3

The procedure described in Example 1 is followed, but after homogenizing, the dispersion is stored for 15 days in a closed vessel, without stirring. The measurements are shown in the Table.

EXAMPLE 4

The procedure described in Example 1 is followed, but the pressure in the homogenizing apparatus is 294 bar. The measurements are shown in the Table.

COMPARATIVE EXPERIMENT 1

After having been dispersed in the ball mill, the dispersion described in Example 1 is used immediately without having been homogenized. The measurements are shown in the Table.

COMPARATIVE EXPERIMENT 2

After having been dispersed in the ball mill, the disperion described in Example 1 is stored for 15 days in a closed vessel and is then used without having been homogenized. The measurements are shown in the Table.

COMPARATIVE EXPERIMENT 3

After having been dispersed in the ball mill, the dispersion described in Example 1 is after-treated in an apparatus for exerting shearing forces, as described in German Pat. No. 2,119,568, Example 1, and is then processed into a magnetic coating as described above. The measurements are shown in the Table.

TABLE

|  | Examples | | | Comparative experiments | | |
| --- | --- | --- | --- | --- | --- | --- |
|  | 1 | 2 | 3 | 1 | 2 | 3 |
| Magnetic properties | | | | | | |
| Residual induction $M_R$ in the playing direction (mT) | 147 | 144 | 140 | 128 | 117 | 132 |
| Orientation ratio RF | 2.5 | 2.4 | 2.3 | 1.9 | 1.7 | 2.1 |
| Electroacoustic properties | | | | | | |
| $A_T$ | +2.7 | +2.2 | +1.7 | 0 | −1.0 | +0.7 |
| $A_H$ | −1.6 | +2.0 | +1.4 | −0.2 | −0.7 | +0.5 |
| Average peak-to-valley height Rtm | 0.08 | 0.06 | 0.10 | 0.15 | 0.17 | 0.12 |
| Abrasion test | | | | | | |
| Drop in signal level (db) | −0.5 | 0 | −0.7 | 1.4 | 4.0 | 2.0 |
| Head deposits Rating | 1-2 | 1 | 1-2 | 2 | 2-3 | 2-3 |

We claim:

1. In a process for the manufacture of a magnetic recording medium by dispersing a mixture of particulate anisotropic magnetic material and additives in a solution of a polymeric binder in an organic solvent, applying a layer of the dispersion to a non-magnetizable base, orienting the anisotropic magnetic materials by means of a magnetic field and drying the coating, the improvement which comprises: subjecting the dispersion, before application to the base, to a pressure of from 98 to 784 bar and immediately thereafter releasing the dispersion under pressure through a valve onto an impact member.

2. The process of claim 1, wherein the valve through which the compressed dispersion is released is a nozzle.

3. The process of claim 1, wherein the valve through which the compressed dispersion is released is an annular gap.

* * * * *